United States Patent [19]
Reuter

[11] Patent Number: 5,911,393
[45] Date of Patent: Jun. 15, 1999

[54] INCLINATION-ADAPTER FOR A SUPPORT ARM SYSTEM

[75] Inventor: Wolfgang Reuter, Burbach, Germany

[73] Assignee: Rittal-Werk Rudolf Loh GmbH & Co. KG, Herborn, Germany

[21] Appl. No.: 09/066,320

[22] PCT Filed: Oct. 22, 1996

[86] PCT No.: PCT/EP96/04579

§ 371 Date: Apr. 28, 1998

§ 102(e) Date: Apr. 28, 1998

[87] PCT Pub. No.: WO97/16677

PCT Pub. Date: May 9, 1997

[30] Foreign Application Priority Data

Oct. 28, 1995 [DE] Germany ............... 195 40 298

[51] Int. Cl.⁶ .................................................. F16M 11/14
[52] U.S. Cl. ............................... 248/181.1; 248/371
[58] Field of Search ........................ 248/133, 181.1, 248/182.1, 183.2, 184.1, 291.1, 371, 923; 396/419, 428; 74/104, 109

[56] References Cited

U.S. PATENT DOCUMENTS

| | | | |
|---|---|---|---|
| 3,970,274 | 7/1976 | Resk | 248/371 |
| 4,693,128 | 9/1987 | Plow | 74/104 |
| 5,335,142 | 8/1994 | Anderson | 248/183.2 |

FOREIGN PATENT DOCUMENTS

| | | |
|---|---|---|
| 1123300 | 9/1956 | France . |
| 362825 | 11/1922 | Germany . |
| 2810259 | 9/1979 | Germany . |
| 3410158 | 9/1985 | Germany . |
| 9418392 | 1/1995 | Germany . |

*Primary Examiner*—Ramon O. Ramirez
*Assistant Examiner*—Robert Lipcsik
*Attorney, Agent, or Firm*—Pauley Peterson Kinne & Ferjer

[57] ABSTRACT

An inclination adapter for a support arm system, the adapter having a base part with an adjusting spindle and an inclination member, the base part and the inclination member pivotably connected to each other and the pivot movement performed via a coupling member which can be adjusted by the adjusting spindle. An inclination adapter which is sufficiently stable for a support arm system and has simple parts is produced because the base part and the inclination member comprise connection plates with central openings. Coupled spaced-apart, mutually facing bearing bars are integrally formed on the base part and the inclination member, respectively, and mounted to be pivotable parallel to the connection plates via the base part and the inclination member. The adjusting spindle is guided by a cam, which has a circular cross-section and is part of the coupling member, in a guide slot in a bearing bar of the inclination member, and the guide slot is in the region of the bearing bar which extends beyond the pivot mounting.

15 Claims, 4 Drawing Sheets

INCLINATION-ADAPTER FOR A SUPPORT ARM SYSTEM

BACKGROUND OF THE INVENTION

1. Field of the Invention

This invention relates to an inclination adapter for a support arm system with a base element having an adjusting spindle and an inclination body, wherein the base element and the inclination body are pivotably connected with respect to each other, and the pivoting movement can be performed by a coupling member which can be adjusted by the adjusting spindle.

2. Description of Prior Art

An inclination adapter of this type, designed as a tripod head for a TV camera, is known from German Patent Reference DE 28 10 259. Here, the base element can be pivoted around a vertical axis, and the inclination body can be pivoted around a horizontal axis relative to the base element. For obtaining the pivoting of the inclination body, a coupling member embodied as a U-shaped hoop, can be adjusted by the adjusting spindle, wherein the adjusting spindle is seated in the inclination body. A guide element, which is connected with the pivot shaft of the inclination body and controls the pivoting movement, is arranged between the legs of the U-shaped hoop.

An inclination adapter of this type is not suitable for a support arm system, since the structure is too complicated and also the structure cannot absorb and transmit the forces occurring, to a sufficient extent. The attachment of a control device at the end of a support arm should only be mentioned.

SUMMARY OF THE INVENTION

It is one object of this invention to create an inclination adapter of the type mentioned at the outset which is very simply constructed and which can absorb and transmit the high loads required in connection with a support arm system.

In accordance with this invention, this object is attained with the base element and the inclination body having connecting plates with central openings. Respectively, one pair of support strips, which are spaced apart from and oriented toward each other, is formed on the base element and the inclination body, by which the base element and the inclination body are seated, pivotable parallel with the connecting plates. The adjusting spindle is guided in a guide slot of a support strip of the inclination body by an engagement piece, which is round in cross section, of the coupling member, wherein the guide slot is cut in the area of the support strip which extends past the pivot seating.

The base element and the inclination body are simple parts, which can be produced with sufficient stability. The coupling member can be simply adjusted for performing the pivot movement of the inclination body, wherein a secure coupling with the inclination body always exists.

If in accordance with one embodiment the connecting plates and the support strips have recesses, starting from the connecting sides of the base element and the inclination body, and are essentially made double-walled, then the base element and the inclination body can be produced as simple cast parts without hampering stability.

In accordance with one embodiment, the adjusting spindle is rotatably seated in two bearing bushes of the base element, and the coupling member is adjustable to a limited extent between the bearing bushes acting as detents. Thus, a sufficiently large pivoting range is obtained for the use of the inclination adapter in a support arm system, and the adjusting spindle with the coupling member is simultaneously fixed in place on the base element.

So that the coupling member always remains in engagement with the inclination body, during adjustment the coupling member is held, fixed against relative rotation, by a lateral contact strip of the base element.

In accordance with one embodiment, the pivot seating between the inclination body and the base element is designed such that the seating strips of the inclination body are arranged on outsides of the seating strips of the base element. The seating strips are pivotably connected in pairs with each other by bearing bolts. The bearing bolts are fixed in such a way that the bearing bolts are offset in diameter, wherein the section with the greater diameter is used as a detent, and wherein the bearing bolts are maintained axially non-displaceable by grub screws or a retaining ring.

A coupling free of play between the coupling member and the inclination body is achieved in that the width of the guide slot in the seating strip of the inclination body is adapted to the diameter of the round engagement piece of the coupling member and permits limited pivoting of the latter in a direction towards the pivot shaft.

For obtaining a symmetrical pivot range, in one embodiment at the center position of the coupling member between the bearing bushes of the base element, the connecting plates of the base element and the inclination body are located in parallel planes, and can be displaced towards both sides out of the center position, at the same angle.

Finally, the inclination adapter can be covered, without making the passage of cables, hoses, or the like more difficult, because the connecting sides of the base element and the inclination body are enclosed by a preferably one-piece protective covering, having covering plates with central openings and a bellows.

BRIEF DESCRIPTION OF THE DRAWINGS

This invention will be explained in more detail by means of an exemplary embodiment represented in the drawings, wherein.

DESCRIPTION OF PREFERRED EMBODIMENTS

Figure 1:
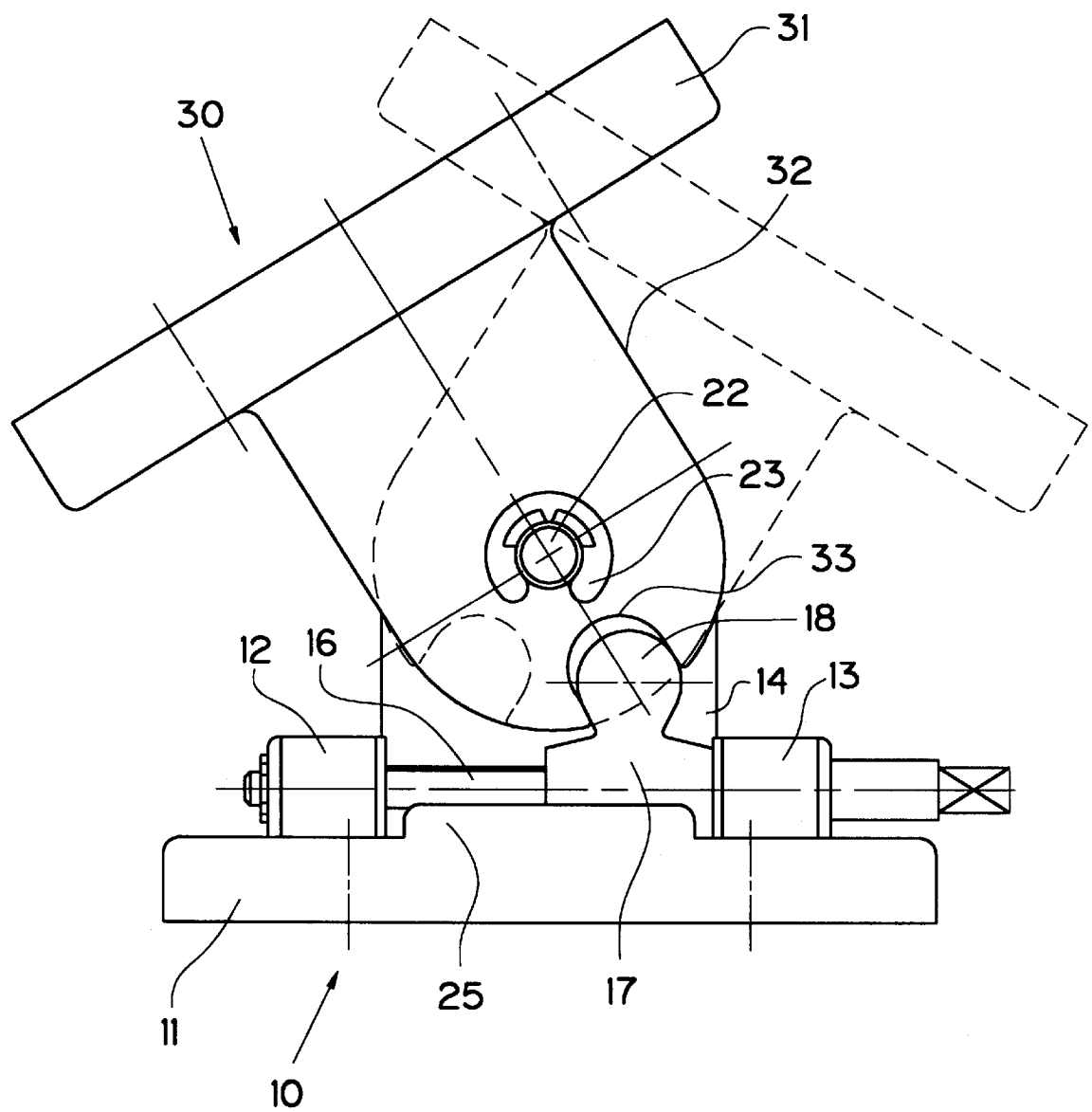
FIG. 1 is a lateral side view of an inclination adapter in a pivoted end position.
Figure 2:
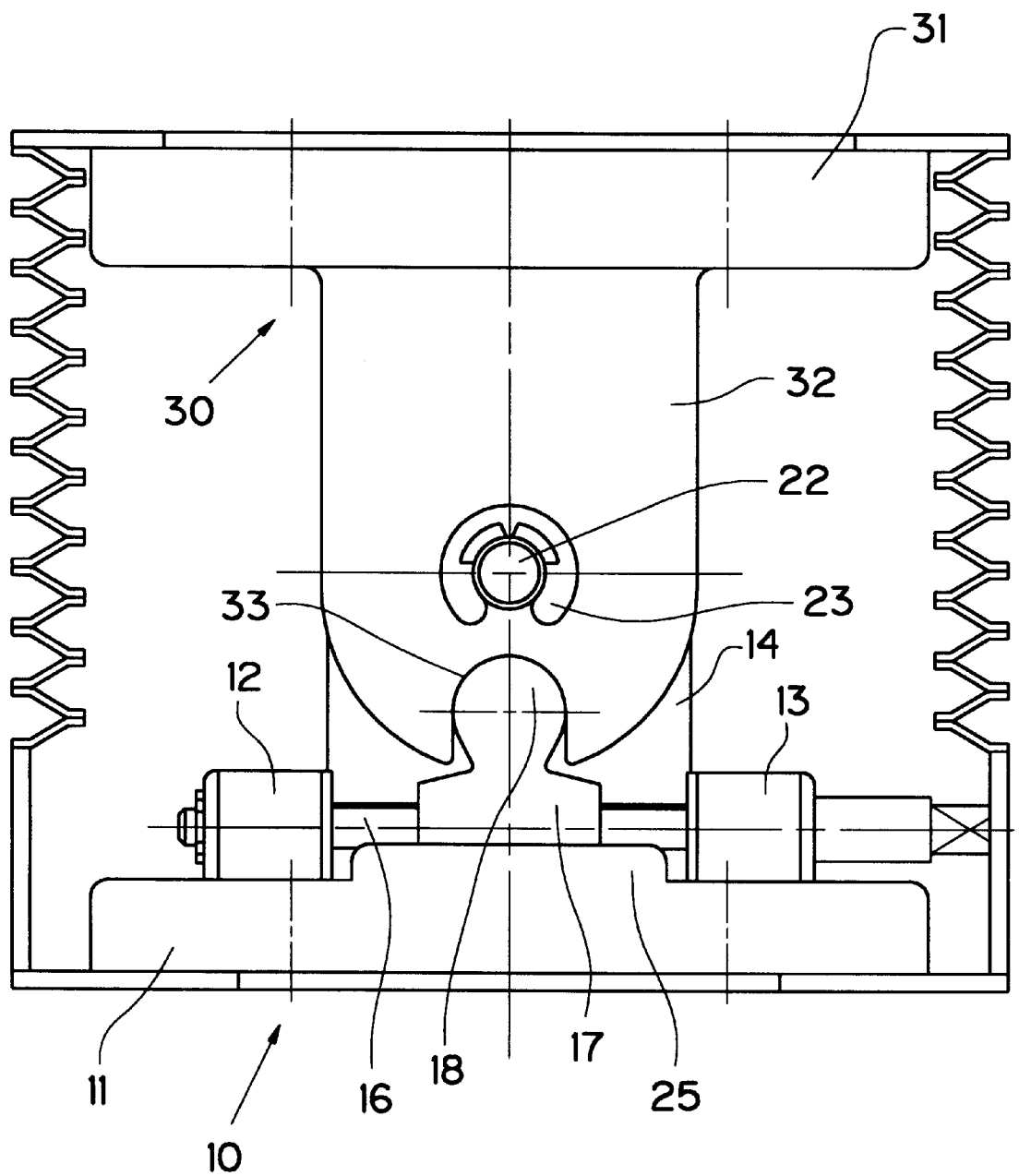
FIG. 2 is a side view of an inclination adapter, in a center position, with a bellows covering.
Figure 3:
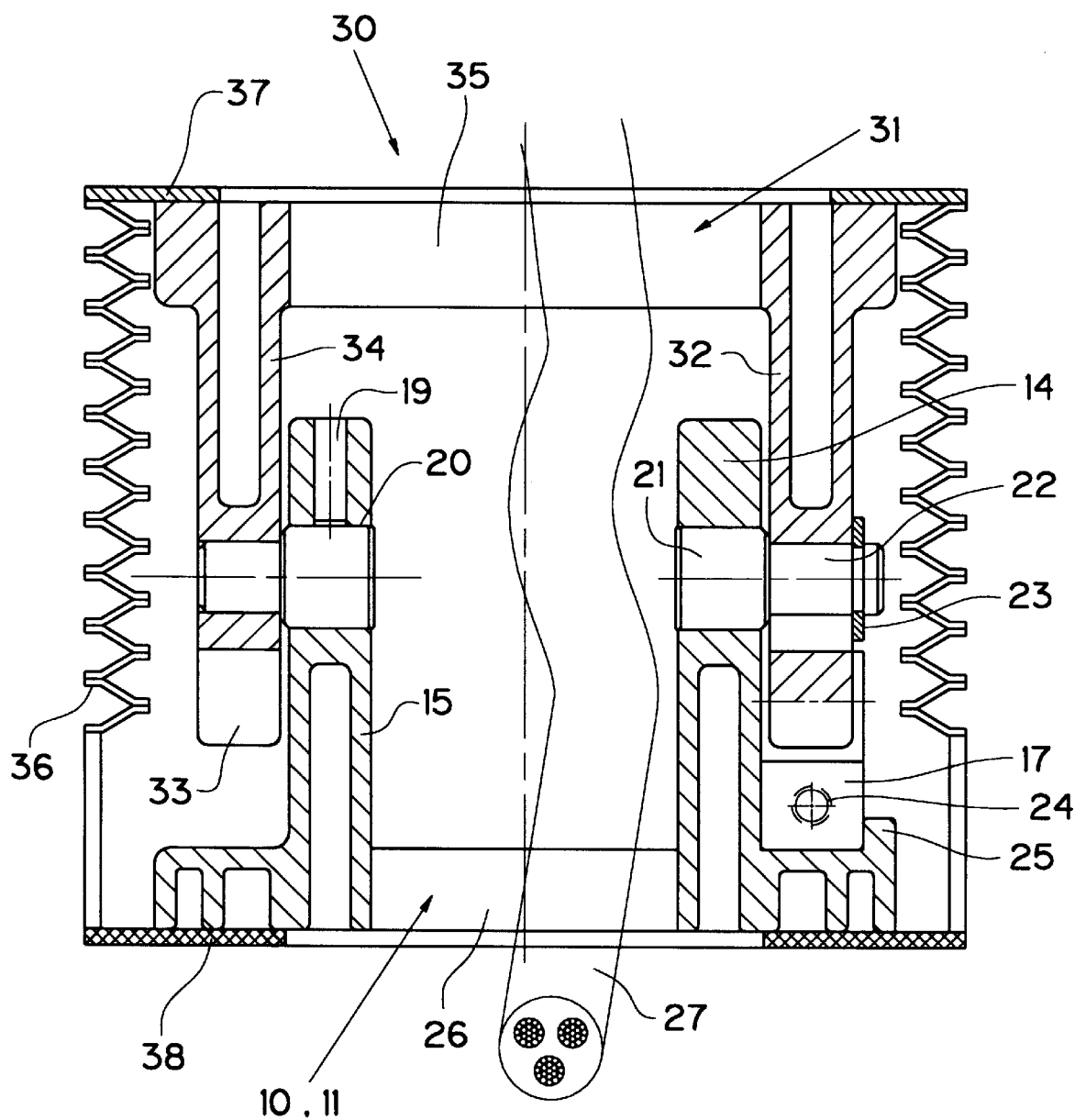
FIG. 3 is a side view of an inclination adapter in a plane displaced by 90° with respect to the position shown in FIG. 2.

As can be seen from FIGS. 1 to 4, the inclination adapter comprises a base element 10, having an adjusting spindle 16, and an inclination body 30. Both elements have a round connecting plate 11, or respectively 31, as shown in FIG. 3, which is recessed from the connecting sides and is essentially embodied in a double-walled fashion, so that they can be produced as simple, cost-effective and yet stable cast elements. The adjusting spindle 16 is seated in two spaced-apart bearing bushes 12 and 13 of the base element 10, and adjustably receives the coupling member 17, which has a threaded bore 24, between the bearing bushes 12 and 13. So that the coupling member 17 cannot twist during adjustment, it is laterally guided by a contact strip 25 of the base element 10, as shown in FIGS. 2 and 3.

Pairs of spaced-apart seating strips 14 and 15, or respectively 32 and 34 as shown in FIG. 3, which are aligned parallel with each other and are arranged in such a way, that the seating strips 32 and 34 of the inclination body 30 adjoin the outsides of the seating strips 14 and 15 of the base element 10, are formed on the connecting plates 11 and 31 which have central openings 26, or respectively 35 as shown in FIG. 3.

Bearing bolts with sections 21 and 22, which have offset diameters, are used for pivotal seating. The sections 21 with the larger diameter are inserted into correspondingly large seating bores of the seating strips 14 and 15 of the base element 10, and are used as axial detents at the seating strips 32 and 34 of the inclination body 30. The sections 22 of smaller diameter of the bearing bolts are inserted into correspondingly designed bores of the seating strips 32 and 34 of the inclination body 30 and are axially secured by grub screws 19 or retaining rings. Cables 27, hoses, or the like can be inserted through the parts of the inclination adapter pivotably connected in this way, even if the inclination adapter has a preferably single-piece protective covering, which can comprise cover plates 37 and 38 and a bellows 36. As shown in FIG. 3, the cover plates 37 and 38 have openings for this purpose.

As FIG. 1 shows, the coupling member 17 has an engagement piece 18, which is round in cross section and is inserted into a guide slot 33 in the seating strip 14 of the inclination body 30, in which it is displaceable in a limited way in the direction toward the pivot axis. Since both seating strips 32 and 34 have a guide slot 33, the inclination body 30 can be connected with the base element 10 in two positions, which are offset by 180°, which makes assembly of the inclination adapter easier. The guide slot 33 is of a width corresponding to the diameter of the engagement piece 18 of the coupling member 17. Here the cutting of the guide slots 33 into the free ends of the seating strips 32 and 34 facing away from the pivot axis is such, that in the center position of the coupling member 17 as shown in FIG. 2, the connecting plates 11 and 31 of the base element 10 and the inclination body 30 are located in parallel planes, i.e. take on an inclination of 0° with respect to each other. The coupling member 17 can be displaced out of this center position toward both sides until the coupling member 17 contacts the detent on the bearing bush 12 or the bearing bush 13. This results in equal pivot angles in both pivot directions, as shown in FIG. 1.

Since coupling between the inclination body 30 and the engagement piece 18 of the coupling member 17 is provided in the area of the seating strips 32 and 34 extending past the pivot axis, the connecting plate 31 of the inclination body 30 is pivoted counterclockwise in the course of a displacement of the coupling member 17 toward the right as shown in FIG. 1, while during displacement of the coupling member 17 toward the left, the connecting plate 31 of the inclination body 30 is pivoted clockwise and can take up the end pivot position indicated by dashed lines.

Figure 4:
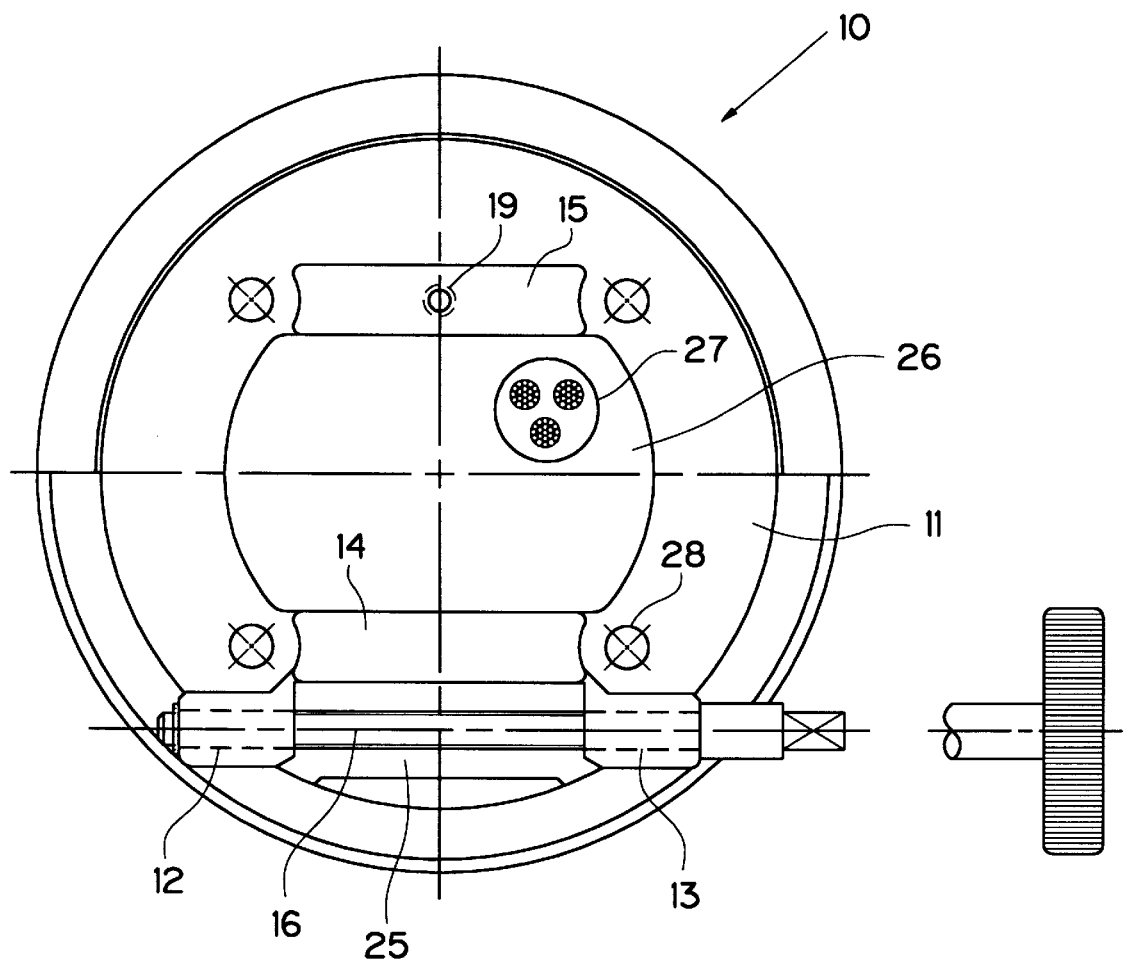
FIG. 4 is a top view of a base element used with the inclination adapter in accordance with FIGS. 1 to 3.

Finally, as shown in FIG. 4 how the adjusting spindle 16 is seated on the base element 10 and how the seating strips 14 and 15 are located with respect to the center opening 26. The inclination adapter can be fastened to the end of a support arm or on a control device via the fastening bores 28 of the connecting plate 11. If the inclination adapter is fastened at the end of a support arm, the fastening bores 28 are matched to threaded strips formed on the support arm and are aligned.

The adjustment of the adjusting spindle 16 can be provided in a manner known to those skilled in the art by means of a tool, hand crank, adjusting knob, and the like.

I claim:

1. In an inclination adapter for a support arm system with a base element having an adjusting spindle and an inclination body, wherein the base element and the inclination body are pivotably connected with respect to each other, and a pivoting movement is performed by a coupling member adjusted by the adjusting spindle, the improvement comprising:

the base element (10) and the inclination body (30) each having a connecting plate (11,31) with a central opening (26, 35);

respectively one pair of support strips (14, 15; 32, 34) spaced apart from and oriented toward each other formed on the base element (10) and the inclination body (30) on which the base element (10) and the inclination body (30) are seated pivotally parallel with the connecting plates (11, 31); and the adjusting spindle (16) guided in a guide slot (33) of a support strip (32) of the inclination body (30) by an engagement piece (18) which is round in cross section of the coupling member (17), and the guide slot (33) cut in an area of the support strip (32).

2. In an inclination adapter in accordance with claim 1, wherein the connecting plates (11, 31) and the support strips (14, 15; 32, 34) have a plurality of recesses, starting from a plurality of connecting sides of the base element (10) and the inclination body (30), and are double-walled.

3. In an inclination adapter in accordance with claim 2, wherein the adjusting spindle (16) is rotatably seated in two bearing bushes (12, 13) of the base element (10), and the coupling member (17) is adjustable to a limited extent between the bearing bushes (12, 13) acting as detents.

4. In an inclination adapter in accordance with claim 3, wherein during adjustment the coupling member (17) is fixed against relative rotation by a lateral contact strip (25) of the base element (10).

5. In an inclination adapter in accordance with claim 4, wherein the seating strips (32, 34) of the inclination body (30) are arranged on outsides of the seating strips (14, 15) of the base element (10), and the seating strips (14, 32, or respectively 15, 34) are pivotably connected in pairs with each other by a plurality of bearing bolts (21, 22).

6. In an inclination adapter in accordance with claim 5, wherein the bearing bolts (21, 22) are offset in diameter, wherein a section of each of the bearing bolts (21 22) with a greater diameter is used as a detent, and the bearing bolts (21, 22) are maintained axially non-displaceable by one of a plurality of grub screws (19) and a retaining ring (23).

7. In an inclination adapter in accordance with claim 6, wherein a width of the guide slot (33) in the support strip (32) of the inclination body (30) is adapted to a diameter of the engagement piece (18) of the coupling member (17) and permits limited pivoting of the coupling member (17) in a direction towards a pivot shaft.

8. In an inclination adapter in accordance with claim 7, wherein in a center position of the coupling member (17) between the bearing bushes (12, 13) of the base element (10), the connecting plates (11, 31) of the base element (10) and the inclination body (30) are located in parallel planes, and are displaceable towards both sides out of the center position at a same angle.

9. In an inclination adapter in accordance with claim 8, wherein connecting sides of the base element (10) and the inclination body (30) are enclosed by a one-piece protective covering having a plurality of covering plates (37, 38) with central openings and a bellows (36).

10. In an inclination adapter in accordance with claim 1, wherein the adjusting spindle (16) is rotatably seated in two bearing bushes (12, 13) of the base element (10), and the coupling member (17) is adjustable to a limited extent between the bearing bushes (12, 13) acting as detents.

11. In an inclination adapter in accordance with claim 1, wherein the seating strips (32, 34) of the inclination body (30) are arranged on outsides of the seating strips (14, 15) of the base element (10), and the seating strips (14, 32, or respectively 15, 34) are pivotably connected in pairs with each other by a plurality of bearing bolts (21, 22).

12. In an inclination adapter in accordance with claim 11, wherein the bearing bolts (21, 22) are offset in diameter, wherein a section of each of the bearing bolts (21, 22) with a greater diameter is used as a detent, and the bearing bolts (21, 22) are maintained axially non-displaceable by one of a plurality of grub screws (19) and a retaining ring (23).

13. In an inclination adapter in accordance with claim 1, wherein a width of the guide slot (33) in the support strip (32) of the inclination body (30) is adapted to a diameter of the engagement piece (18) of the coupling member (17) and permits limited pivoting of the coupling member (17) in a direction towards a pivot shaft.

14. In an inclination adapter in accordance with claim 13, wherein in a center position of the coupling member (17) between the bearing bushes (12, 13) of the base element (10), the connecting plates (11,31) of the base element (10) and the inclination body (30) are located in parallel planes, and are displaceable towards both sides out of the center position at a same angle.

15. In an inclination adapter in accordance with claim 1, wherein connecting sides of the base element (10) and the inclination body (30) are enclosed by a one-piece protective covering having a plurality of covering plates (37, 38) with central openings and a bellows (36).

* * * * *